Jan. 22, 1924.  1,481,753
W. J. SPIRO
THROTTLE CONTROL
Filed Jan. 2, 1923  2 Sheets-Sheet 1
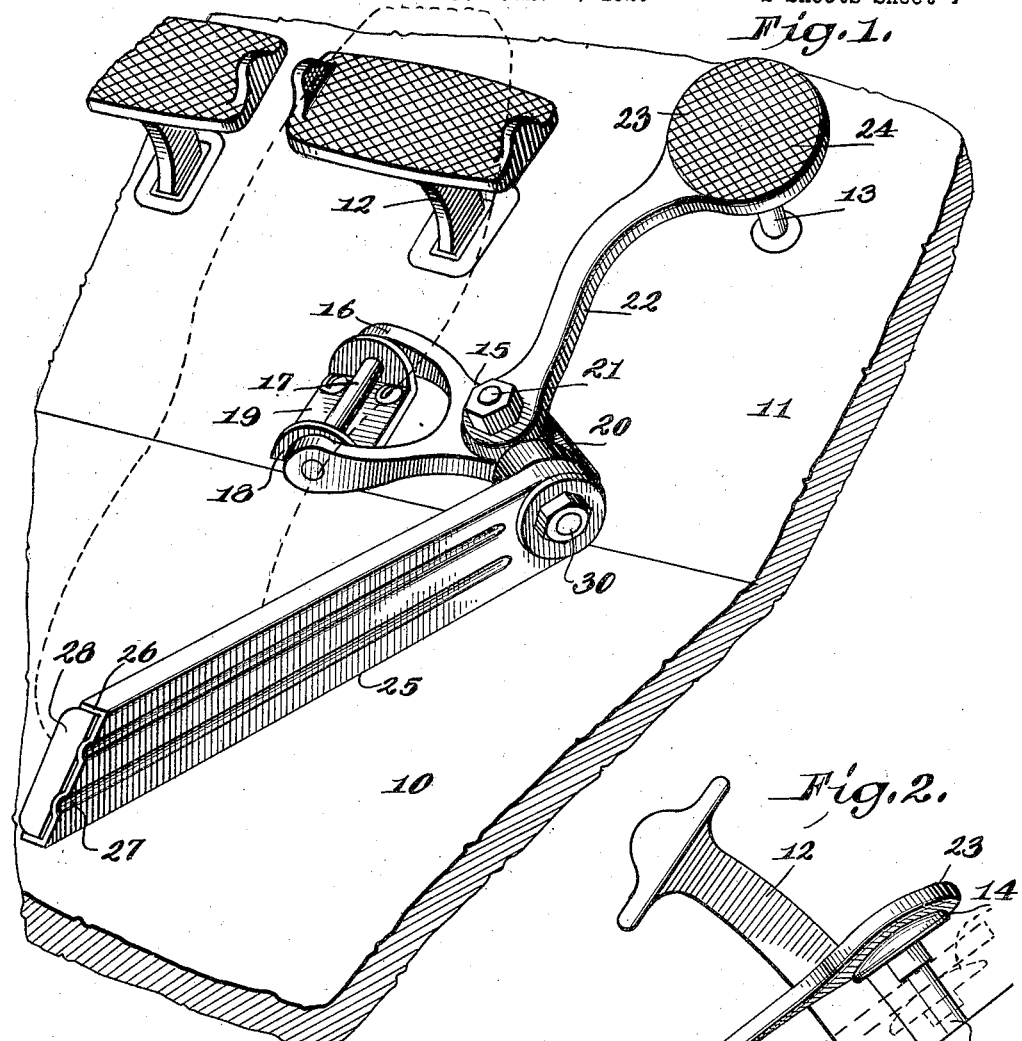
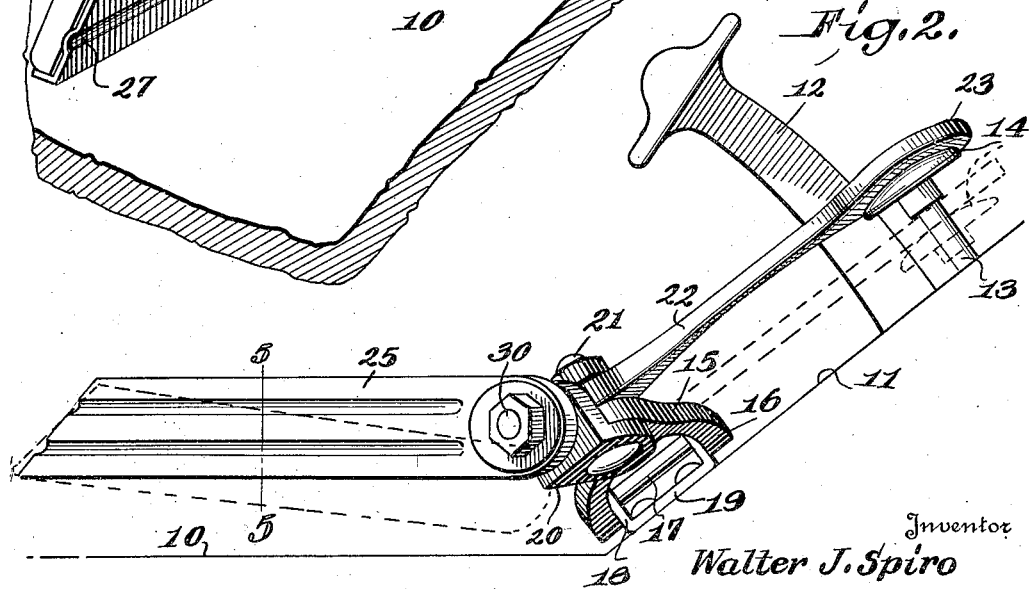
Inventor
Walter J. Spiro
By Alfred T. Gage
Attorney

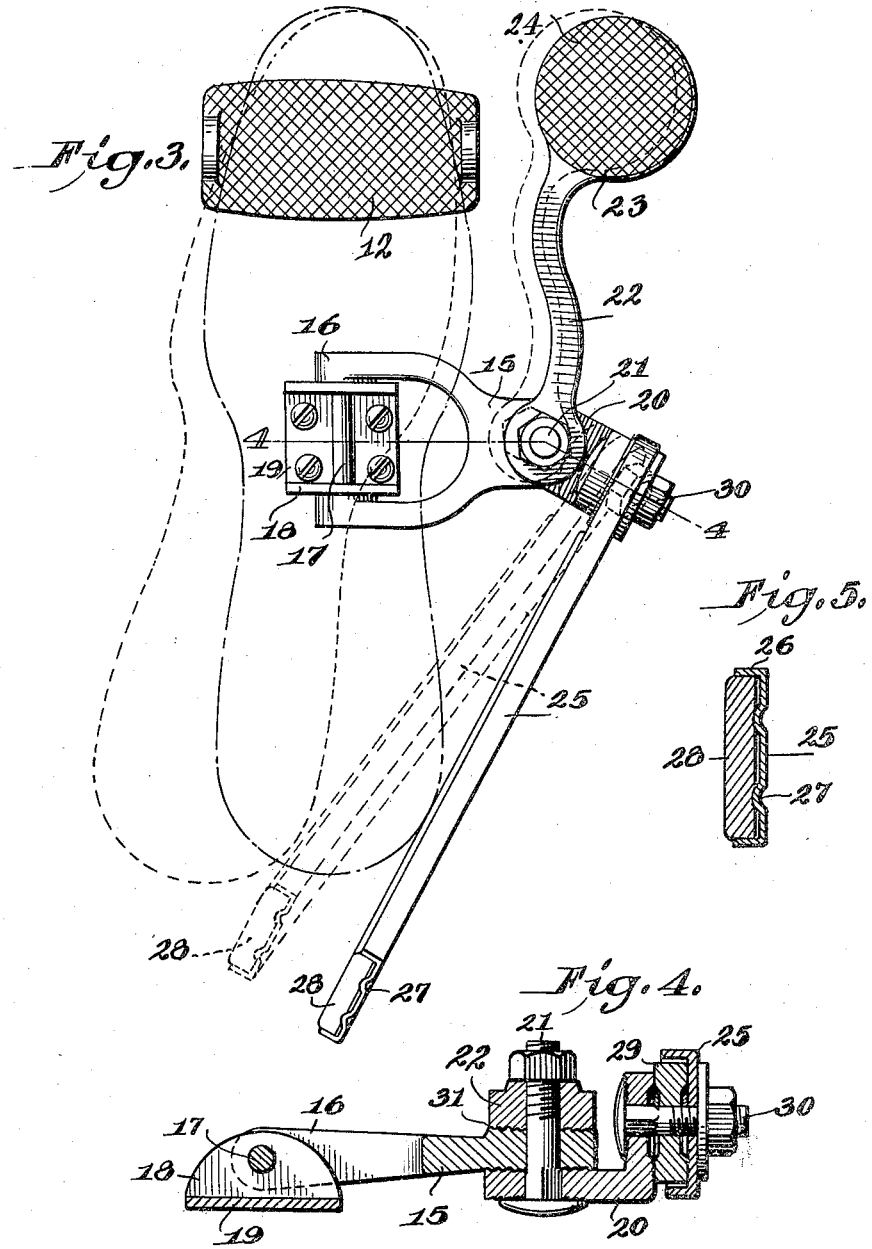

Patented Jan. 22, 1924.

1,481,753

UNITED STATES PATENT OFFICE.

WALTER J. SPIRO, OF WHITE PLAINS, NEW YORK.

THROTTLE CONTROL.

Application filed January 2, 1923. Serial No. 610,216.

*To all whom it may concern:*

Be it known that I, WALTER J. SPIRO, a citizen of the United States, residing at White Plains, in the county of Westchester and State of New York, have invented certain new and useful Improvements in Throttle Controls, of which the following is a specification.

This invention relates to a throttle control and particularly to a construction adapted for application as an attachment to the brake lever and accelerator connection for an ordinary automobile construction.

The invention has for an object to provide a novel and improved construction of control lever pivoted upon a foot board to swing toward and from the same and having a control arm engaging an accelerator connection on said board and a rearwardly extending operating arm.

Another object of the invention is to present a new arrangement of control lever in its relation to the brake pedal and accelerator connection at the foot board whereby the lateral movement of the operator's foot when upon said pedal will effect a travel of a control arm in alinement with said connection.

A further object of the invention is to provide a lever attachment comprising a body portion upon which operating and actuating levers are adjustably mounted for positioning relative to the brake pedal and accelerator connection of an automobile.

Other and further objects and advantages of the invention will be hereinafter set forth and the novel features thereof defined by the appended claims.

In the drawings—

Figure 1 is a perspective showing the invention applied;

Figure 2 is a side elevation thereof;

Figure 3 is a top plan;

Figure 4 is a section on line 4—4 of Figure 3 and

Figure 5 is a detail section on line 5—5 of Figure 2.

Like numerals refer to like parts in the several figures of the drawings.

The invention is designed as an attachment for the ordinary automobile construction embodying substantially a horizontal floor board 10 and an inclined foot board 11 through which the brake pedal lever 12 extends and also the accelerator connection 13 which terminates in a push head 14. The control lever comprises a body portion 15 pivotally mounted in any desired manner, for instance by a yoke 16 carrying a pivot 17 journalled in the lugs 18 of the bracket 19 which is secured to the inclined foot board substantially in alinement with the pedal lever 12. The body 15 carries at its outer end an angle bracket 20 secured thereto by a clamping bolt 21 which also passes through and adjustably retains in position a control arm 22 terminating at its free end in a plate 23 disposed in contact with the accelerator head 14. This plate may be formed with a roughened face 24 for direct application of the foot thereto in actuating the accelerator.

The angle bracket 20 also has adjustably clamped thereto a rearwardly extending operating arm 25, which normally lies in a plane diagonal to that of the lever pivot, and may be of any preferred construction. The form herein shown comprises a channel iron 26 having longitudinal strengthening corrugations 27 and embracing a filler 28 for contact with the heel portion of the operator's shoe. The secured end of the arm contains a spacer block 29 and is adjustably clamped in position by a bolt 30 passing through the angle bracket and parts to be secured thereto. If found desirable one or more of the faces of the clamped members or brackets may be serrated or roughened, as shown at 31, to increase the frictional holding contact.

The mounting of the control arm permits its adjustment laterally of its lever pivot to accurately position the contact plate over the accelerator connection, while the angle bracket may be adjusted to position the operating arm in a diagonal plane relative to the lever pivot. A further adjustment of this arm in a vertical plane may be effected at its connection with angle bracket so that a wide field of adjustment is provided for both arms in order to accommodate the foot of the operator and effect the most accurate and efficient operation of the accelerator by a side movement of the operator's heel while the foot is supported upon the brake pedal. The control lever is normally supported in the full line position of Figure 2 by the spring tension of the accelerator connection and pressure upon the free end of the operating arm causes a downward swing of the outer end of the control lever carrying with it the actuating arm which depresses the accelerator button, as indicated by dotted lines in Figure 2. When the operator's foot is in the dotted line position of Figure 3 the accelerator is at rest and when the heel is moved to the broken line position in that figure the accelerator is fully actuated and the parts are in the dotted position of Figure 2.

This invention is particularly designed as an attachment for brake and accelerator constructions now in common use and permits the operator's foot to be in constant contact with the brake pedal and in operative position for the accelerator. This avoids shifting the position of the foot and the accidental operation of either control member, while the foot is supported against the effect of road vibrations upon the acceleration. The structure also provides means by which the brake and accelerator may be jointly operated to secure the most efficient results in starting on a grade or against resistance. The mounting of the control lever is such that the accelerator restoring spring is relieved of its weight and is amply sufficient to return the lever to normal position when the foot pressure is withdrawn therefrom. The lever when adjusted to proper position constitutes a unit member as both arms are rigid relatively to the pivot and the lever body swings toward and from the inclined foot board while the operating arm traverses a lateral and downward path toward the horizontal floor board.

While the details of construction have been specifically shown and described, the invention is not confined thereto, as changes and alterations may be made therein without departing from the spirit of the invention as defined by the following claims.

What I claim is:

1. A pivoted throttle control lever, an operating member extending rearwardly from the free end thereof toward the axis of the lever pivot, and an oppositely extended control member upon the lever disposed to contact with an accelerator.

2. A pivoted throttle lever, an operating member extending rearwardly from the lever at one side of its pivot and diagonal thereto and an oppositely extended control member disposed to contact with an accelerator.

3. A throttle control lever comprising a body pivoted at one edge, a control arm extended laterally from the body in a plane substantially parallel with said pivot, and an operating arm extending in an opposite direction from the body and in a plane diagonal to the control arm.

4. A throttle lever comprising a pivoted body, an operating arm extended laterally therefrom at one side of its axis, and an oppositely disposed control arm extended from the body at an angle greater than a right angle from the operating arm.

5. A throttle lever comprising a pivoted body, a control arm adjustably mounted thereon, a supporting bracket upon said body, and a rearwardly extending operating arm mounted upon said bracket for vertical adjustment relative to said control arm.

6. A throttle lever comprising a pivoted body, a control arm adjustably mounted thereon, an angle bracket adjustably secured to said body, and an operating arm pivotally adjustable at its inner end upon said bracket.

7. A throttle lever comprising a body having a pivoting yoke, an angle bracket pivotally adjustable upon said body, a control arm pivotally adjustable upon said body, a clamping bolt extending through said arm, body and bracket, and an operating arm carried by said bracket.

8. A throttle lever comprising a body having a pivoting yoke, a pivot carrying bracket for said yoke, an angle bracket secured to said body, a control arm thereon, clamping means for adjustably securing said bracket and arm, and a rearwardly extending operating arm pivotally adjustable at its inner end upon said bracket.

9. A throttle lever comprising a pivoted body, an accelerator actuating arm carried thereby, and a foot operated arm extended rearwardly from the body and formed as a channel member embracing a projecting filler block to engage the heel of the operator.

10. A pivoted throttle lever comprising a forwardly extending accelerator actuating member and a rearwardly extending foot operated member, said members being movable toward and from a foot board in different paths of travel at one side of the pivotal axis of the lever.

11. The combination with a brake pedal and accelerator actuating member, of a control lever pivoted in substantial alinement with said pedal and having an operating arm at one side of the lever axis disposed for actuation by a lateral movement of the heel of a foot upon the pedal and a control lever movable toward and from said member.

12. The combination with a brake pedal and accelerator actuating member disposed upon an inclined foot board, of a lever having a pivot parallel with said board, a horizontal arm from said lever movable laterally and downwardly toward the car floor, and an angularly disposed control arm movable toward and from the floor board.

13. The combination with a brake pedal and accelerator actuating member disposed upon an inclined foot board, of a lever having its pivot parallel with said board and in alinement with said pedal, a control arm upon said lever having a head in contact with said member, and an operating arm extending rearwardly from the lever in a plane diagonal to the pivot thereof.

In testimony whereof I affix my signature.

WALTER J. SPIRO.